July 7, 1964

E. W. JOHNSON 3,140,145

INTERVAL TIMER

Filed Jan. 18, 1962

INVENTOR
EARL W. JOHNSON
BY
ATTORNEY

July 7, 1964   E. W. JOHNSON   3,140,145
INTERVAL TIMER
Filed Jan. 18, 1962   4 Sheets-Sheet 2
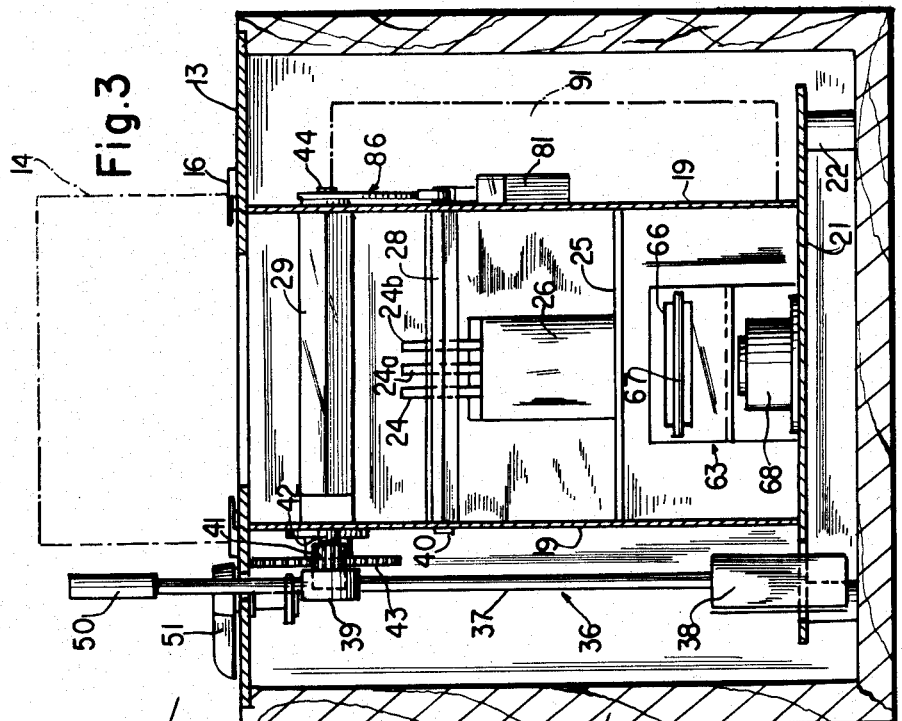
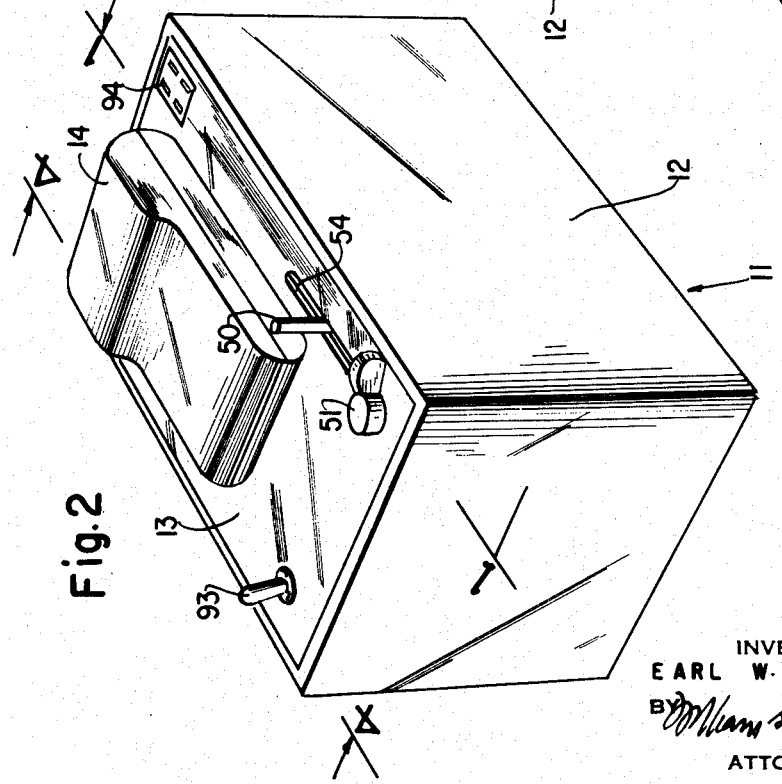
INVENTOR
EARL W. JOHNSON
BY
ATTORNEY July 7, 1964

E. W. JOHNSON 3,140,145

INTERVAL TIMER

Filed Jan. 18, 1962

INVENTOR
EARL W. JOHNSON
BY
ATTORNEY

July 7, 1964 E. W. JOHNSON 3,140,145
INTERVAL TIMER

Filed Jan. 18, 1962 4 Sheets-Sheet 4

INVENTOR
EARL W. JOHNSON
BY
ATTORNEY

United States Patent Office 3,140,145
Patented July 7, 1964

3,140,145
INTERVAL TIMER
Earl W. Johnson, Bartlesville, Okla., assignor to Cities Service Oil Company, Bartlesville, Okla., a corporation of Delaware
Filed Jan. 18, 1962, Ser. No. 167,065
6 Claims. (Cl. 346—109)

This invention relates to interval timers and more particularly to interval timers adapted to record intervals between electrical impulses. Interval timers of the present invention may also function as recording oscillographs and are especially useful in recording time and magnitude information derived from seismic waves produced in geological exploration.

The interval timer of the present invention is especially useful in situations where it is desired to record the time interval between electrical impulses or where it is desired to record the form or magnitude of such electrical impulses. For instance, in geological exploration, it is common to obtain data relating to sub-surface rock or earth formations by creating seismic waves and then measuring the frequency and intensity of such waves at various points. Such measurements are accomplished by the use of conventional equipment such as geophones and the resulting electrical impulses created by the geophones may be used to record such measurements on magnetic tape, fluorescent screens, film or any other suitable recording surface for later analysis. In studies of this type it is frequently desirable to have some means for recording results in the field for immediate interpretation. Conventional recording equipment designed for this purpose is extremely bulky and expensive and not well adapted to immediate interpretation of results. There is a considerable demand for light weight, portable, inexpensive equipment for recording at least a minimum amount of information regarding seismic waves or for measuring intervals between electrical impulses in connection with geological studies of rock and earth formations.

It is, therefore, an object of the present invention to provide an improved interval timer.

It is another object of the invention to provide an improved oscillographic camera capable of recording seismic information.

In accordance with a preferred embodiment of the present invention, an oscillographic camera in which a light source is focused onto a rotatable galvanometer mirror is provided with self-developing film positioned in the path of the beam of light reflected from the galvanometer mirror. A rotatable mirror is positioned in the path of light between the galvanometer mirror and the film and means are provided for rotating the rotatable mirror at a non-uniform velocity so as to move the image of the light beam along the film surface at a uniform velocity in a direction perpendicular to the direction in which the light beam is deflected on the film surface by the galvanometer mirror.

For a better understanding of the present invention reference should be had to the accompanying drawings in which:

FIGURE 2 is a perspective view of the interval timer shown in FIGURE 1;

FIGURE 3 is a sectional view with some parts removed of the interval timer shown in FIGURE 1 and taken as indicated by line 3—3 of FIGURE 1;

Figure 1:
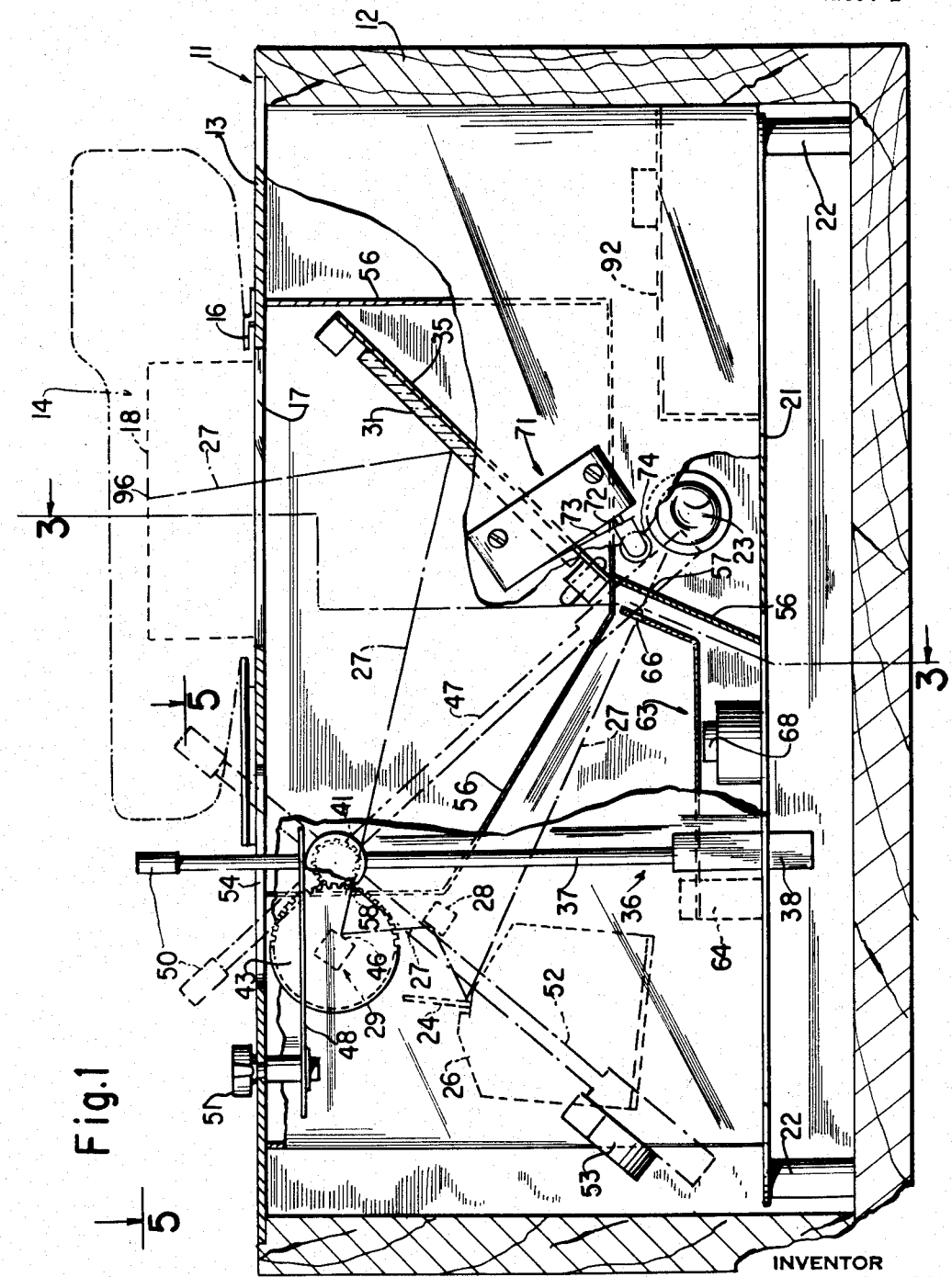
FIGURE 1 is a front sectional elevation view, partly broken away and with some parts removed, of an interval timer constructed in accordance with a preferred embodiment of the invention and taken as indicated generally by line 1—1 of FIG. 2.

Referring to the drawings, FIGURES 1 through 3 show an interval timer 11 constructed in accordance with the invention. The interval timer 11 may be contained in a suitable box or housing 12. The housing 12 may be constructed of any suitable materials and in the form shown has wooden sides and bottom and a metal top member 13. For convenience, the top member 13 may form an integral portion of the apparatus while the remainder of the housing 12 may be separate so that the interval timer may be removed therefrom for servicing. In the form shown, the interval timer 11 is adapted to record time intervals, magnitude and wave forms of electrical impulses on self-developing type film contained in a conventional camera 14 of a self-developing type. Cameras of this type are well known and are capable of producing completed photographs within about 10 seconds after the exposure is completed. For use in this manner, the camera 14 is positioned on the top member 13 by suitable holding fixtures indicated for example at 16 and is in register with an opening 17 in the top member 13 so that light from beneath the top member 13 may be focused upon a film surface 18 within the camera as described below.

While the apparatus is described herein in connection with the production of photographic prints and the use of film of the self-developing type, it will be understood that any suitable light beam image recording surface may be used. Other suitable surfaces might include, for instance, conventional photographic film or other light sensitive surfaces such as surfaces treated to fluoresce in response to stimulation by light. Likewise, the light beam image recording surface 18 may be adapted for viewing for a limited time only (as in the case of fluorescent surfaces).

In operation of the apparatus shown in the drawings, the objective is to achieve linear movement of one or more light beam images across the film or other light beam image recording surface while deflecting the light beams in a direction perpendicular to the linear movement across the film surface in response to and in proportion to the magnitude of received stimuli such as electric impulses. In order for such apparatus to function properly, it is necessary to reduce or eliminate the opportunity for light other than the desired light beams to reach the film surface. This is accomplished by suitable means and in the instant apparatus is accomplished by providing a light tight housing comprising portions of the top member 13 and camera 14 (FIG. 1) as well as side members 19 and a bottom 21 which may rest directly on the bottom of the housing 12 or may be provided with suitable feet such as 22 for supporting it a short distance above the bottom of the housing as shown in FIG. 3. Suitable means such as an exciter lamp 23 (FIG. 1) are provided within the housing 12 for producing light to be used in making the recordings on the film surface 18. Light from the lamp 23 is reflected from mirrors of rotating mirror galvanometers and is then reflected on to the film surface 18 in the manner described below. While any suitable number of rotating mirror galvanometers may be used, the specific apparatus shown in the drawings is provided with three such galvanometers, designated 24, 24a and 24b (FIG. 3), and these are housed in a conventional galvanometer block 26. The galvanometer block 26 may be secured within the housing by suitable means such as a plate 25 extending between the side members 19 (FIG. 3). In order to provide connections to the rotating mirror galvanometers, suitable terminals such as 94 may be provided at the upper member 13 of the housing (FIG. 2). Conventional wiring (not shown) may be used to interconnect the various electrical portions of the apparatus described herein. While only the galvanometer 24 will be discussed further below, it should be understood that the action of each of these galvanometers is similar and depends upon the electrical impulses received by each individual galvanometer.

Referring to FIG. 1, a representative light beam 27 is shown passing from the lamp 23 to the film surface 18. The light beam 27 will be used herein to describe the operation and construction of the interval timer 11. From the lamp 23, the light beam 27 is reflected by the mirror of the rotating mirror galvanometer 24 to a fixed mirror 28 from which it is reflected to a rotatable mirror 29. From the rotatable mirror 29, the light beam 27 passes to a second fixed mirror 31 from which it is reflected onto the film surface 18.

Figure 8:
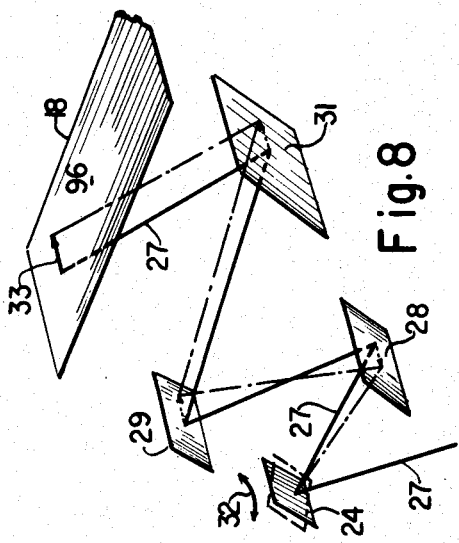
FIGURE 8 is a diagrammatic view similar to FIGURE 7 and showing another aspect of the movement of light through the apparatus.

The fixed mirror 31 may be mounted in a suitable manner such as upon a plate 35 secured to the housing in any suitable manner. Likewise, the fixed mirror 28 may be mounted in a suitable manner such as upon an axle 40 fixed to the side members 19 (FIG. 2). It is readily apparent that when the galvanometer 24 reacts to an electrical current by rotation of its mirror in a conventional manner, the light beam 27 will be deflected. The effect of such deflection is best shown in FIG. 8 from which it can be seen that deflection of the rotating mirror galvanometer 24 as indicated by dotted lines and an arrow 32 will result in deflection of the light beam 27 across the film surface 18 as indicated by an arrow 33. In order to obtain accurate recordings, the mirror of the rotating mirror galvanometer 24 is preferably of the proper focal length to allow the image of the light beam 27 to be focused as a small spot on the plane of the film surface 18. If this is done, no other lenses need be used in the interval timer 11. To obtain an accurate picture of the wave form of an electrical impulse received by the galvanometer 24 or to measure the time interval between impulses received by one or more of the galvanometers 24, 24a and 24b, it is necessary to provide means for moving the images of the light beam images such as 27 along the film surface 18 at a uniform linear velocity in a direction perpendicular to the direction in which such light beam images are deflected by movement of the galvanometers (as indicated by the arrow 33). Such movement of the light beam images may be caused by rotation of the rotatable mirror 29 at a suitable velocity. Since rotation of the mirror 29 at a uniform velocity would result in a non-uniform velocity of movement of the image of the light beam 27 along the film surface 18, rotation of the mirror 29 must be controlled at a suitable non-uniform velocity so as to provide the desired uniform linear velocity of movement of the light beam image along the film surface. In the interval timer 11 this is accomplished by gearing the movement of the rotating mirror 29 to the movement of a pendulum 36 in the gravitational field. As best shown in FIGS. 1 and 3, the pendulum 36 may include a shaft 37 and a weight 38. The weight 38 is preferably moveable to thereby vary the rotational speed with which the pendulum moves through the gravitational field. The upper end of the shaft 36 terminates in a fitting 39 (FIG. 3) which carries or is fixed to a gear 41 and is mounted to pivot freely about an axle 42 which is fixed to the side member 19 of the light tight housing. The teeth of the gear 41 engage teeth of a gear 43 (FIG. 1) carried by an axle 44 which also carries the rotatable mirror 29. As best shown in FIG. 1, the rotatable mirror 29 has a flat reflecting surface 46 for reflecting the light beam 27 as described herein. The means such as gears 41 and 43 used to gear the movement of the rotatable mirror to the movement of the pendulum 36 should be arranged so as to cause movement of the light beam 27 across the desired extent of the film surface 18 in response to movement of the pendulum 36 through a desired angle in the gravitational field.

Figure 7:
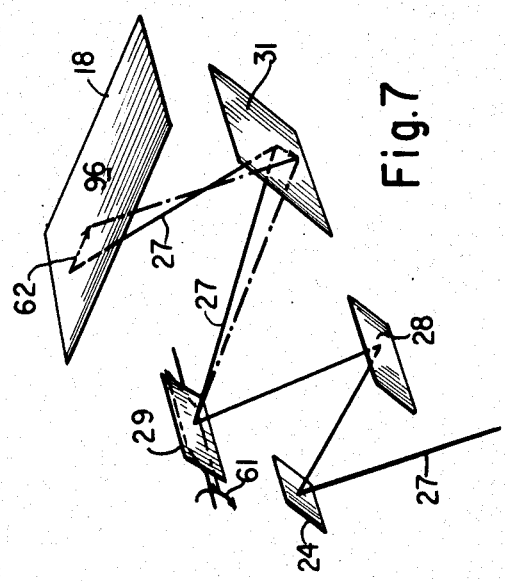
FIGURE 7 is a diagrammatic view showing the movement of a beam of light through the apparatus shown in FIGURES 1 through 6.

For a better understanding of the operation of the mirror 29, reference may be had to FIG. 7 from which it can be seen that rotation of the mirror 29 as indicated by an arrow 61 results in movement of the image of the light beam 27 from the solid line position to the dotted line position and movement of the light beam image along the film surface 18 as indicated by an arrow 62.

Figure 5:
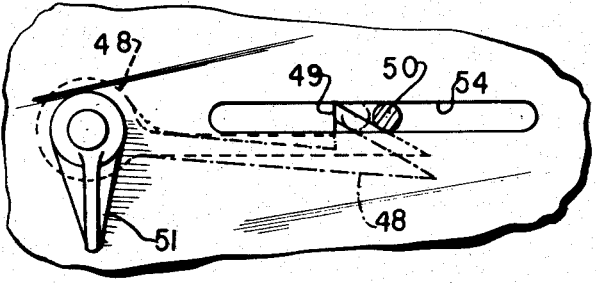
FIGURE 5 is a partial plan view of the apparatus shown in FIGURES 1 and 2.

To provide for uniformly reproducible movement of the pendulum 36, suitable means are preferably provided for maintaining the pendulum in a raised position and for releasing the pendulum from the raised position when it is desired to initiate operation of the interval timer 11. As shown in FIG. 1, the pendulum 36 may be maintained in a raised position such as indicated in dotted lines at 47 by the use of a latch 48 having a detent portion 49 (FIG. 5) adapted to engage an upwardly projecting member 50 affixed to the fitting 39 of the pendulum 36. The upwardly projecting member 50 might, of course, form a continuous part of the shaft 37 of the pendulum if desired. The latch 48 may be provided with suitable spring means (not shown) for urging the latch into engaging position with the upwardly projecting member 50. A release knob 51 may be attached to the latch 48 and project upwardly through the top of the housing 12. The release knob 51 may then be moved against the action of the spring means in order to release the pendulum 36 for movement in the gravitational field. When this is done, the pendulum moves from the position indicated in dotted lines 47 (FIG. 1) to the position indicated in solid lines and then to the position indicated in dotted lines at 52. At this position suitable means such as a magnet 53 are preferably provided to restrain reverse movement of the pendulum 36. When it is desired to reset the pendulum for another swing, it may be forcibly pulled away from the magnet 53 by the use of the extending member 50 and replaced in the position 47 in which the latch 48 will retain it until released by the releasing knob 51. A suitable slot is provided in the top member 13 of the housing 12 as indicated at 54 through which the upwardly extending member 50 may project for convenience in resetting the pendulum.

In order to prevent undesirable leakage of light from the lamp 23 or from the rotating mirror galvanometer 24 onto the film surface 18, suitable means such as a light shield 56 (FIG. 1) are preferably provided for shielding the film surface 18 from extraneous light from within the housing 12. The light shield 56 is provided with suitable slots 57 and 58 (FIG. 1) for allowing passage of light from the lamp 23 to the galvanometer 24 and from the rotating mirror 29 to the fixed mirror 31.

It will be apparent from a study of FIG. 1 that movement of the image of the light beam 27 along the film surface 18 in response to a given degree of rotation of the rotatable mirror 29 will be relatively less when the image of the light beam is directly above the point of reflection from fixed mirror 31 and will be relatively greatest at points on the film surface furthest removed from the approximate area of reflection from the mirror 31. The rotational velocity of movement of the pendulum 36 in the gravitational field, on the other hand, is relatively less near positions 47 and 52 and relatively greater at the vertical position indicated in solid lines in FIG. 1. It is thus possible by proper arrangements of the mirrors, pendulum and film surface to use the non-uniform velocity of movement of the pendulum 36 in the gravitational field to impart a non-uniform velocity of rotation to the mirror 29 which compensates for the non-linear movement of the light beam image which would be the result of uniform velocity of rotation of the mirror 29. By thus rotating the mirror 29 at a non-uniform velocity determined by the movement of the pendulum 36, a linear sweep of uniform velocity of the image of the light beam 27 across the film surface 18 may be obtained. For instance, if the mirror 31 is positioned so as to reflect the image of the light beam 27 onto a central portion 96 of the film surface 18 when the path of the light beam striking the film surface is perpendicular thereto, then the pendulum 36 should be adjusted to be in the perpendicular position shown in solid lines in FIG. 1 at this point in the rotation of the mirror 29 so that the point of least relative velocity of movement of the light image across the film surface 18 corresponds to the point of maximum velocity of rotation of the pendulum in the gravitational field and, therefore, maximum speed of the rotation of the mirror 29.

Figure 6:
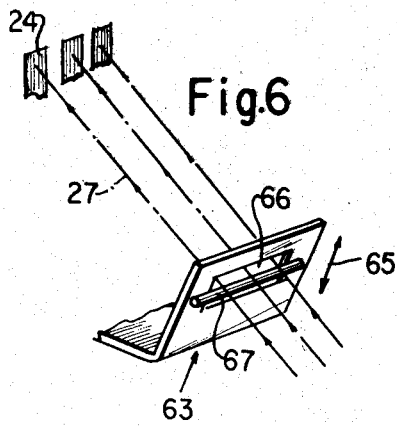
FIGURE 6 is a somewhat diagrammatic fragmentary perspective view of a portion of the apparatus shown in FIGURE 1.

In order to provide convenient means for measuring time in relation to the movement of the image of the light beam 27 across the film surface 18, suitable means are preferably provided for periodically and briefly interrupting the light beam at known time intervals during movement of the pendulum 36 in the gravitational field. As best shown in FIGS. 1, 3 and 6, such means may include a vibrating member 63, one end of which is fixed with respect to the lower member 21 of the light tight housing by suitable means such as a supporting member 64. The free end of the vibrating member 63, remote from the member 64, is positioned so as to be in the path of light beam 27. The free end of the vibrating member 63 is provided with a slot 66 having a wire or strip 67 positioned longitudinally across the center of the slot (FIGS. 3 and 6) in position to interrupt the light beam 27 when the vibrating member 63 is at rest. The slot 57 in the light shield 56 is preferably of a proper width to insure substantial interruption of the light beam 27 by the wire 67 when the vibrating member 63 is at rest. Suitable means, such as an electro-magnet 68, are preferably provided for holding the vibrating member 63 in a position other than its normal position of rest. Upon release from such means, the vibrating member vibrates so as to move the slot 66 and wire 67 in a direction generally perpendicular to the path of light from the lamp 23 to the galvanometer 24. As a result, the wire 67 interrupts the light beam 27 twice during each cyycle of vibration of the vibrating member 63.

Direction of movement of the vibrating member 63 with respect to the light beam 27 is shown by an arrow 65 in FIGURE 6. By adjusting the vibrating member to the desired frequency of vibration, it is thus possible to interrupt the light beam 27 frequently and briefly at known time intervals. Thus, if the vibrating member 63 is operating while the pendulum 36 and rotating mirror 29 are sweeping the image of the light beam 27 across the film surface 18, the recorded image of the light beam will be broken into segments, each one of which represents a time interval equal to one-half the amount of time it takes the vibrating member 63 to complete a cycle of vibration.

To insure that the vibrating member 63 is vibrating properly during movement of the pendulum 36, the electromagnet 68 holding the vibrating member out of its normal rest position may be deactivated by movement of the pendulum. As shown in FIG. 1, this may be accomplished by making operation of the electromagnet 68 dependent upon maintenance of an electrical circuit including two electrical contacts in a switch 71. As shown, one such contact 72 may be permanently mounted on the body of the switch 71 and the other contact 73 may be in the form of a spring naturally tending to remain away from the contact 72. The normal action of the switch 71 is thus to leave the electrical circuit including the contacts 72 and 73 open and the electromagnet 68 inoperative. To complete the electrical circuit and activate the electromagnet 68, the spring contact 73 must be forced down against the contact 72. As shown in FIG. 1, the switch 71 may be positioned so that the contact 72 is held against the spring contact 73 by a member 74 mounted on contact 73 when the pendulum 36 is in the raised position 47. Upon release of the pendulum from the raised position and start of movement of the pendulum in the gravitational field, the contact 73 moves away from the contact 72 under urging of the spring and opens the circuit, thereby cutting off current to the electromagnet 68 and releasing the vibrating member 63 for vibration as described above. When the pendulum 36 is returned to the raised position 47 preparatory to another use of the apparatus, the contacts 72 and 73 again meet and allow current to flow to the electromagnet 68, thereby pulling the vibrating member 63 into position for release again.

Figure 4:
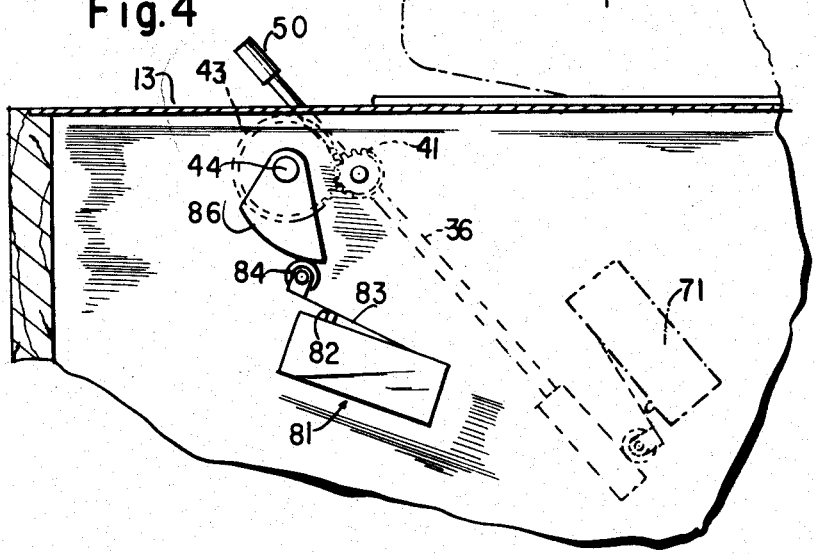
FIGURE 4 is a partial sectional elevation view taken as indicated by line 4—4 of FIGURE 2.

In order to provide a time reference standard for measurement on the film surface 18 of the time interval between two electrical impulses, suitable means is preferably provided for completing an electrical circuit at a pre-selected position of movement of the rotatable mirror 29. In the apparatus shown and as best shown in FIG. 4, such means may include a switch 81 having a fixed contact 82 and a moveable spring contact 83 normally tending to remain apart from the contact 82 but adapted to be forced into contact therewith by pressure upon a projecting member 84. The switch 81 is controlled by a cam 86 mounted on the axle 44 on which the rotatable mirror 29 is mounted. The cam 86 is so positioned that movement of the pendulum 36 and rotatable mirror 29 during normal operation of the interval timer 11 as described above causes the cam to contact the projecting member 84 and complete the electrical circuit to the switch 81 at a predetermined point in the movement of the rotatable mirror 29. The closing of such an electrical circuit may be used to send an electrical impulse directly to a rotating mirror galvanometer or, as described in greater detail below, may be used to initiate formation of seismic waves in geological studies.

In order to make the interval timer 11 completely portable and self-contained, a source of electrical current, such as conventional flashlight batteries, for operating the lamp 23 and electromagnet 68 is preferably provided and may be located as indicated at 91 in FIG. 3. Likewise, for initiating seismic waves, a source of electrical current, such as a conventional battery, may be provided as indicated at 92 in FIG. 1. This latter source of current may include a suitable condenser and may be connected to the switch 81 for provision of current in an electrical circuit in response to movement of the pendulum 36 and rotatable mirror 29 as described above. A switch 93 (FIG. 2) is preferably provided for shutting off current to the lamp 23 and electromagnet 68. Thus, if the interval timer 11 is left with the switch 93 off and the pendulum 36 in a raised position as to avoid maintenance of an electrical circuit in the switch 81, there will be no current drain while the apparatus is not in use.

Figure 9:
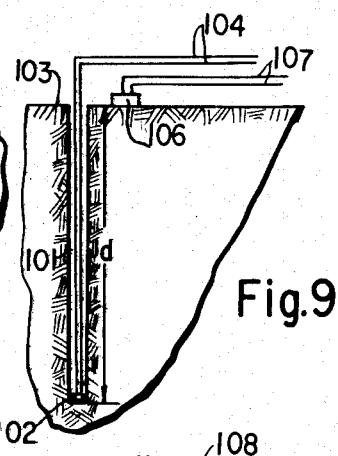
FIGURE 9 is a somewhat diagrammatic elevation view illustrating a use of the apparatus of FIGURES 1 through 6.

FIGURE 9 illustrates the use of the interval timer 11 described above in connection with the measurement of the velocity at which seismic waves travel through an earth or rock formation. Such information is necessary in seismic work in which an explosive charge is detonated in a shot hole below the earth's surface. In such work, it is necessary to know the velocity at which the seismic waves travel though the material in which the hole is drilled. This situation is illustrated in FIG. 9 which shows a shot hole 101 having an explosive charge 102 positioned in the lower portion thereof a distance below the surface 103 of the earth. The explosive charge 102 is equipped with conventional detonating means which may be detonated by an electric current supplied through wires 104. In order to detect seismic waves created by detonation of the explosive charge 102, a conventional geophone 106 is placed at the surface near the shot hole 101. The geophone 106 is connected, as by wires 107, to one of the rotating mirror galvanometers of the interval timer 11. The electrical circuit, including the wires 104, which supplies electricity for detonating the explosive charge 102 is connected to another of the galvanometers of the interval timer. Thus, when the interval timer 11 is operated as described above, the cam operated switch 81 serves to complete the electrical circuit to the explosive charge 102 to thereby detonate the same. The same electrical charge which detonates the explosives also serves to record the moment of such closing of the circuit on the film surface 18 by deflection of one of the light beams such as 27 due to the action of the galvanometer to which the electrical circuit is connected. An electrical impulse is created in the circuit represented by the wires 107 when the seismic waves created by the explosion at the bottom of the shot hole 101 reach the geophone 106 at the surface. By means of the galvanometer to which such circuit is connected, this impulse may be used to deflect another of the light beams such as 27 on the film surface 18.

Figure 10:
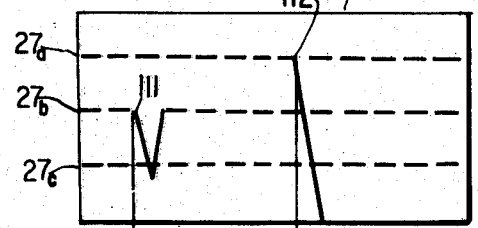
FIGURE 10 is a graphical representation of a typical record produced by the use of apparatus of FIGURES 1 through 6 as illustrated in FIGURE 9.

FIGURE 10 illustrates the type of record obtained when using the interval timer 11 as described above in connection with FIG. 9. In FIG. 10, 108 represents a print of a self-developing film containing the record of a test such as that described above in connection with FIG. 9. 27a represents the path of a light beam deflected by a rotating mirror galvanometer connected to the electrical circuit represented by the wires 107 in FIG. 9 and is thus responsive to electrical impulses created by the geophone 106. 27b represents a light beam deflected by the galvanometer connected to the electrical circuit used to detonate the explosive charge 102 as represented by the wires 104 in FIG. 9. 27c represents a light beam deflected by a galvanometer which is not connected to any electrical circuit and which may be used as a convenient standard for measuring time intervals on the record.

In the operation of the interval timer 11 as described in connection with FIG. 9, detonation of the explosive charge 102 in response to operation of the switch 81 is recorded as indicated at 111 (FIG. 10). This represents the moment at which seismic waves are created at the bottom of the shot hole 101. The moment at which such seismic waves reach the surface of the formation and create electrical impulses in the geophone 106 is recorded as indicated at 112 in FIG. 10. The time interval between these events may thus be measured merely by measuring the distance which the light beams 27a and 27b have swept longitudinally across the film surface 108 between these two occurrences. If the vibrating member 63 is in operation, this may conveniently be accomplished by visual inspection of the number of light pulses occurring between the points 111 and 112 as described below.

Figure 12:
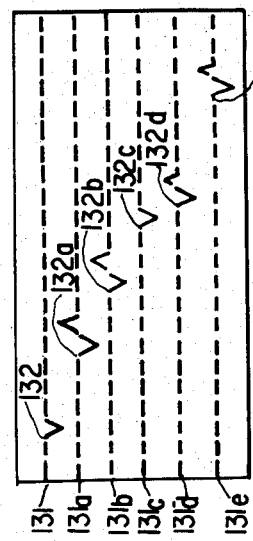
FIGURE 12 is a graphical representation of a record obtainable by the use of apparatus of the present invention as illustrated in FIGURE 11.
Figure 11:
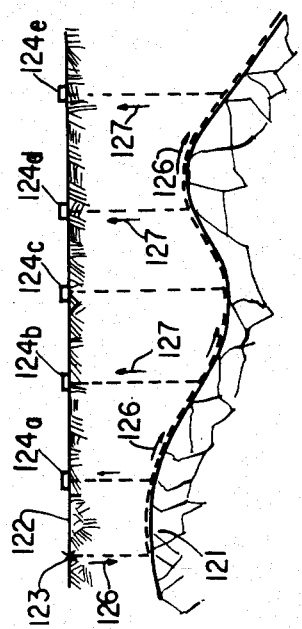
FIGURE 11 is a somewhat diagrammatic elevation view illustrating another use of apparatus similar to that shown in FIGURES 1—6.

FIGURES 11 and 12 illustrate the use of an interval timer similar to the timer 11 described above to obtain information relative to the depth of a rock bed below the surface of the earth at different points. Such information is useful, for instance, in construction work, where it is important to know where and to what extent rock may be encountered during excavation. FIG. 11 illustrates a bed rock formation 121 below the surface of the earth 122. By spacing geophone such as 124a–e at various points along the surface of the earth and connecting each geophone to a rotating mirror galvanometer in an interval timer similar to the interval timer 11 described above, the relative times at which seismic waves from a point 123 reach each of the geophones may be recorded. In a manner similar to that described above, the moment at which the seismic waves are created at the point 123 may also be recorded. Seismic waves created at the point 123 travel through the earth formation to the bed rock 121. Since rock formations allow travel of seismic waves at considerably higher velocities than sand or dirt, the energy travels through the rock bed at a relatively higher velocity, as indicated schematically by dotted lines and arrows 126 in FIG. 11. This energy is reflected from the rock bed upwardly through the earth to the geophones 124a–e, as indicated very schematically by dotted lines and arrows 127, at a velocity considerably lower than the velocity of travel along the rock bed. The time of arrival of seismic waves at each of the geophones 124a–e may thus provide an indication of the depth of the bed rock 121 below each of the geophones. This is illustrated for example in FIG. 12, which is a representation of the record of such a test as recorded on film such as the film surface 18 described above. In FIG. 12 the dashed lines 131 and 131a–e represent the travel of light beam images of light beams such as the light beam 27 along the film surface while points 132 and 132a–e represent deflections of such light beams by the corresponding rotating mirror galvanometers in response to electrical impulses. The points 132a–e represent deflections in response to receipt of seismic waves at the geophones 124a–e of FIG. 11, while the point 132 represents an electrical impulse occurring at the moment of creation of the seismic waves at the point 123 of FIG. 11. As in the case of FIG. 10, the time interval between the various recorded phenomenon described may be measured visually simply by counting the increments of recorded light beam image occurring between each of the two points.

In the use of the interval timer 11 as described in connection with FIG. 9 to obtain a record similar to that shown in FIG. 10, a total of three rotating mirror galvanometers were used to produce light beam images corresponding to the images 27a–c of FIG. 10. The galvanometer deflecting the light beam corresponding to the image 27a was connected to a geophone such as the geophone 106 of FIG. 9 positioned at the surface of the earth adjacent a shot hole such as 101. The galvanometer deflecting the light beam corresponding to the image 27b of FIG. 10 was connected to the detonating circuit used for detonating an explosive charge similar to 102 of FIG. 9 and positioned at the bottom of the shot hole a distance d from the surface. The galvanometer in the path of the light beam corresponding to the image 27c represented on FIG. 10 did not receive any electrical impulses and was used merely to provide light beam image segments for visual comparison as shown in FIG. 10. In this test the vibrating member 63 of the interval timer 11 was adjusted to vibrate at the rate of 50 cycles per second thereby producing light beam image segments on the film surface 108 each of which represented a time interval of 0.01 second. The point 111 of FIG. 10 represents the instant at which the explosive charge 102 was detonated to create the seismic waves while the point 112 represents the instant at which the arrival of the seismic waves at the geophone 106 was recorded. By visual inspection from FIG. 10, it can be seen that the time $t$ between these two occurrences was 6.6 light beam image segments or 0.066 second. Since the distance $d$ was measured as 400 ft., the velocity of travel of the seismic waves through the formation was 400 divided by 0.066 or 6,070 ft. per second.

While the invention has been described above in connection with preferred embodiments thereof, it will be understood by those skilled in the art that various changes and modifications may be made without departing from the spirit or scope of the invention and it is intended to cover all such changes and modifications in the appended claims.

I claim:

1. An optical system for an oscillograph in which the time base deflection of a beam of light across the recording surface is substantially constant comprising:
    (a) A line source of light;
    (b) A light beam recording surface in fixed light beam receiving position;
    (c) A rotatable galvanometer mirror positioned relative to said line source of light and said light beam recording surface so as to deflect the light beam across the recording surface in response to and in proportion to the magnitude of electrical signals;
    (d) A rotatable plane mirror positioned in the path of light between said galvanometer mirror and said recording surface, said rotatable plane mirror being rotatable on an axis at 90° to the axis of rotation of said galvanometer mirror;
    (e) A pendulum comprising the driving means for the rotatable plane mirror and being operatively connected with the rotatable mirror so that the point of maximum velocity of rotation of the pendulum, and hence the point of maximum speed of rotation of said rotatable mirror, corresponds to the point at which the relative velocity of movement of the light beam along the recording surface would be least if the rotatable mirror were to be rotated at uniform velocity;

whereby the non-uniform velocity of rotation imparted to said rotatable mirror by said pendulum compensates for the non-uniform movement of the light beam along the recording surface that would occur at uniform rotation of said mirror, thereby causing the light beam to move at a uniform velocity across the recording surface in a direction perpendicular to the direction in which the light beam is deflected on the recording surface by the galvanometer mirror.

2. A recording oscillographic apparatus in which the time base deflection of a beam of light across the recording surface is substantially constant comprising in combination:
    (a) A light-tight housing;
    (b) A line source of light within said housing;
    (c) A light beam recording surface in fixed light beam receiving position;
    (d) A rotatable galvanometer mirror positioned relative to said line source of light and said light beam recording surface so as to deflect the light beam across the recording surfcae in response to and in proportion to the magnitude of electrical signals;
    (e) A rotatable plane mirror positioned in the path of light between said galvanometer mirror and said recording surface said rotatable plane mirror being rotatable on an axis at 90° to the axis of rotation of said galvanometer mirror;
    (f) A pendulum comprising the driving means for the rotatable plane mirror and being operatively connected with the rotatable mirror so that the point of maximum velocity of rotation of the pendulum, and hence the point of maximum speed of rotation of said rotatable mirror, corresponds to the point at which the relative velocity of movement of the light beam along the recording surface would be least if the rotatable mirror were to be rotated at uniform velocity;

whereby the non-uniform velocity of rotation imparted to said rotatable mirror by said pendulum compensates for the non-uniform movement of the light beam along the recording surface that would occur at uniform rotation of said mirror, thereby causing the light beam to move at a uniform velocity across the recording surface in a direction perpendicular to the direction in which the light beam is deflected on the recording surface by the galvanometer mirror.

3. The apparatus of claim 2 and including mechanical means for retaining said pendulum in a raised position and means for releasing said pendulum from such raised position for movement under the influence of the gravitational field so as to rotate said rotatable mirror.

4. The apparatus of claim 3 and including an electrical circuit operatively connected to said rotatable mirror galvanometer and including a cam-operated switch, said cam being positioned so that movement of the pendulum and rotatable mirror causes the cam to complete the electrical circuit at a pre-selected position of rotation of said rotatable mirror; whereby electrical impulses may be transmitted to said rotating mirror galvanometer.

5. The apparatus of claim 2 and including a vibrating member one end of which is secured to said light-tight housing, the free end of said vibrating member being adopted to periodically and briefly interrupt said light beam at known intervals during rotation of said rotatable mirror, whereby the recorded image of said light beam on the recording surface will be broken into segments each one of which represents a time interval equal to one-half the amount of time required for said vibrating member to complete a cycle of vibration.

6. An interval timer in which the time base deflection of a beam of light across the recording surface is substantially constant comprising:
    (a) A light-tight housing;
    (b) A line source of light within said housing;
    (c) A light beam recording surface in fixed light beam receiving position;
    (d) A rotatable galvanometer mirror positioned relative to said light beam recording surface so as to deflect the light beam across the recording surface in response to and in proportion to the magnitude of electrical signals;
    (e) A rotable plane mirror positioned in the path of light between said galvanometer mirror and said recording surface said rotatable plane mirror being rotatable on an axis at 90° to the axis of rotation of said galvanometer mirror;
    (f) A pendulum comprising the driving means for the rotatable plane mirror and being operatively connected with the rotatable mirror so that the point of maximum velocity of rotation of the pendulum, and hence the point of maximum speed of rotation of said rotatable mirror, corresponds to the point at which the relative velocity of movement of the light beam along the recording surface would be least if the rotatable mirror were to be rotated at uniform velocity;
    (g) Mechanical means for retaining said pendulum in a raised position;
    (h) Means for releasing said pendulum from such raised position for movement under the influence of the gravitational field so as to rotate said rotatable mirror;
    (i) An electrical circuit operatively connected to said rotatable mirror galvanometer and including a cam-operated switch, said cam being positioned so that movement of the pendulum and rotatable mirror causes the cam to complete the electrical circuit at a pre-selected position of rotation of said rotatable mirror;

(j) Means including a vibrating member of periodically and briefly interrupting said light beam at known time intervals during the rotation of the rotatable mirror;

whereby the non-uniform velocity of rotation imparted to said rotatable mirror by said pendulum compensates for the non-uniform movement of the light beam along the recording surface that occurs at uniform rotation of said mirror, thereby causing the light beam to move at a uniform velocity across the recording surface in a direction perpendicular to the direction in which the light beam is deflected on the recording surface by the galvanometer mirror.

References Cited in the file of this patent

UNITED STATES PATENTS

| | | |
|---|---|---|
| 2,613,127 | Geiser | Oct. 7, 1952 |
| 2,871,089 | Loper et al. | Jan. 27, 1959 |